United States Patent
Eichrodt et al.

(10) Patent No.: US 6,765,954 B1
(45) Date of Patent: Jul. 20, 2004

(54) SYSTEM AND METHOD FOR IMPLEMENTING A DELTA-SIGMA MODULATOR INTEGRITY SUPERVISOR

(75) Inventors: Christian Eichrodt, Tustin, CA (US); Frode Larsen, Tinton Falls, NJ (US); Arnold Muralt, Fair Haven, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 736 days.

(21) Appl. No.: 09/640,123

(22) Filed: Aug. 16, 2000

Related U.S. Application Data

(60) Provisional application No. 60/149,120, filed on Aug. 16, 1999.

(51) Int. Cl.[7] .............................. H04B 1/38; H04L 5/16
(52) U.S. Cl. ...................................... 375/220; 375/224
(58) Field of Search ................................ 375/219, 222, 375/224, 227, 354, 355, 377, 357, 220, 259; 341/108, 110, 126, 143, 144, 155; 327/40–47

(56) References Cited

U.S. PATENT DOCUMENTS

| | | | |
|---|---|---|---|
| 4,208,650 A | * | 6/1980 | Horn .......................... 714/798 |
| 6,442,195 B1 | * | 8/2002 | Liu et al. ..................... 375/220 |
| 2001/0012775 A1 | * | 8/2001 | Modzelesky et al. ....... 455/427 |

* cited by examiner

Primary Examiner—Jean B. Corrielus
(74) Attorney, Agent, or Firm—Thomas, Kayden, Horstemeyer & Risley

(57) ABSTRACT

A system and a method for constructing a signal integrity supervisor capable of both detecting and triggering an appropriate response when transmit path signals indicate a potential damaging transmitter operating mode. The system and method of the present invention takes advantage of the inherent property of a Delta-Sigma Modulator (DSM) which makes the probability of encountering a long string of consecutive ones or zeroes during nominal operation very small. The signal integrity supervisor ensures safe transmitter operation by monitoring the data and the clock inputs to a digital to analog converter. The system may comprise a data signal supervisor and a clock signal supervisor. The data supervisor may comprise a comparator and a counter and may be configured to power down a line driver upon detecting a data stream having a continuous voltage level. The clock detector may comprise a pair of monostable circuits, an inverter, and a NAND gate and may be configured to reset the transmitter if a "missing" clock signal state is detected. The present invention can also be viewed as providing a method for preventing a transmission unit from forwarding signals that may result in a DC flow condition. In its broadest terms, the method can be described as: monitoring a data signal; generating a first output signal in response to a data signal having an anomalous condition; monitoring a clock signal; and generating a second output signal in response to clock signal having an anomalous condition.

12 Claims, 9 Drawing Sheets

SYSTEM AND METHOD FOR IMPLEMENTING A DELTA-SIGMA MODULATOR INTEGRITY SUPERVISOR

CROSS-REFERENCE TO RELATED APPLICATION

The present application claims the benefit of co-pending U.S. provisional patent application, issued serial No. 60/149,120, and filed Aug. 16, 1999, which is hereby incorporated by reference in its entirety.

FIELD OF THE INVENTION

The present invention generally relates to high-speed data communications. More specifically, the invention relates to a system and method for supervising signals within a communications system, which solves problems that may be created by a transceiver within the communications system operating in an improper mode.

BACKGROUND OF THE INVENTION

With the advancement of technology, and the need for instantaneous information, the ability to transfer digital information from one location to another, such as from a central office (CO) to a customer premise (CP), has become more and more important.

A digital subscriber line (DSL) communication system is but one example of a number of communication systems that may simultaneously transmit and receive digital data between two locations. In a DSL communication system, data is transmitted from a CO to a CP via a transmission line, such as a two-wire twisted pair, and is transmitted from the CP to the CO as well, either simultaneously or in different communication sessions. The same transmission line might be utilized for data transfers by both sites or the transmission to and from the CO might occur on two separate lines. Specifically, FIG. 1 illustrates communication between a central office (CO) 10 and a customer premise (CP) 20 by way of twisted-pair telephone line 30. While the CP 20 may be a single dwelling residence, a small business, or other entity, it is generally characterized as having plain old telephone system (POTS) equipment, such as a telephone 22, a public switched telephone network (PSTN) modem 25, a facsimile machine (not shown), etc. The CP 20 may also include a DSL communication device, such as a DSL modem 23 that may permit a computer 24 to communicate with one or more remote networks via the CO 10. When a DSL service is provided, a POTS filter 21 might be interposed between the POTS equipment such as the telephone 22 and the twisted-pair telephone line 30. As is known, the POTS filter 21 includes a low-pass filter having a cut-off frequency of approximately 4 kilohertz to 10 kilohertz, in order to filter high frequency transmissions from the DSL modem 23 and to protect the POTS equipment.

At the CO 10, additional circuitry is provided. Generally, a line card 18 (i.e., Line Card A) containing line interface circuitry is provided for electrically coupling a data transmission to the twisted-pair telephone line 30. In fact, multiple line cards 14, 18 may be provided (two shown for simplicity of installation) to serve a plurality of local loops. In the same way, additional circuit cards are typically provided at the CO 10 to handle different types of services. For example, an integrated services digital network (ISDN) interface card 16, a digital loop carrier line card 19, and other circuit cards supporting similar and other communication services, may be provided.

A digital switch 12 is also provided at the CO 10 and is configured to communicate with each of the various line cards 14, 16, 18, and 19. On the outgoing side of the CO (i.e., the side opposite the various local loops), a plurality of trunk cards 11, 13, and 15 are typically provided. For example, an analog trunk card 11, a digital trunk card 13, and an optical trunk card 15 are illustrated in FIG. 1. Typically, these circuit cards have outgoing lines that support numerous multiplexed DSL service signal transmissions.

Having introduced a conventional DSL communication system 1 as illustrated and described in relation to FIG. 1, reference is now directed to FIG. 2, which is a prior art functional block diagram illustrating the various elements in a DSL communications link 40 between a line card 18 located within a CO 10 and a DSL modem 23 located at a CP 20. In this regard, the DSL communications link 40 of FIG. 2 illustrates transmission of data from a CO 10 to a CP 20 via a twisted-pair telephone transmission line 30 as may be provided by a POTS service provider to complete a designated DSL communications link 40 between a CO 10 and a CP 20. In addition, FIG. 2 further illustrates the transmission of data from the CP 20 to the CO 10 via the same twisted-pair telephone transmission line 30. With regard to the present illustration, data transmissions may be directed from the CP 20 to the CO 10, from the CO 10 to the CP 20 or in both directions simultaneously. Furthermore, data transmissions can flow on the same twisted-pair telephone transmission line 30 in both directions, or alternatively on separate transmission lines (one shown for simplicity of illustration). Each of the separate transmission lines may be designated to carry data transfers in a particular direction either to or from the CP 20.

The CO 10 may include a line card 18 (see FIG. 1) that may comprise a CO-digital signal processor (DSP) 43, a CO-analog front end (AFE) 45, a CO-line driver 47 and a CO-hybrid 49. As illustrated in FIG. 2, the CO-DSP 43 may receive digital information from one or more data sources (not shown) and may send the digital information to a CO-analog front end (AFE) 45. The CO-AFE 45 interposed between the twisted-pair telephone transmission line 30 and the CO-DSP 43 may convert digital data, from the CO-DSP 43, into a continuous time analog signal for transmission to the CP 20 via the one or more twisted-pair telephone transmission lines 30.

One or more analog signal representations of digital data streams supplied by one or more data sources (not shown) may be converted in the CO-AFE 45 and further amplified and processed via a CO-line driver 47 before transmission by a CO-hybrid 49, in accordance with the amount of power required to drive an amplified analog signal through the twisted-pair telephone transmission line 30 to the CP 20.

As further illustrated in FIG. 2, a DSL modem 23 located at a CP 20 may comprise a CP-DSP 42, a CP-AFE 44, a CP-line driver 46, and a CP-hybrid 48. The CP-hybrid 48, located at the CP 20, may de-couple a received signal from the transmitted signal in accordance with the data modulation scheme implemented by the particular DSL data transmission standard in use. The CP-AFE 44, located at the CP 20, having received the de-coupled received signal from the CP-hybrid 48, may then convert the received analog signal into a digital signal, which may then be transmitted to a CP-DSP 42 located at the CP 20. Finally, the digital information may be further transmitted to one or more specified data sources such as the computer 24 (see FIG. 1).

In the opposite data transmission direction, one or more digital data streams supplied by one or more devices in communication with the CP-DSP 42 at the CP 20 may be converted by the CP-AFE 44 and further amplified via the CP-line driver 46. The CP-hybrid 48, located at the CP 20, may then be used to couple the intended analog representations of the various digital signals to a transmit signal in accordance with the data modulation scheme implemented by the particular DSL data transmission standard in use. As will be appreciated by those skilled in the art, the CP-line driver 46 may transmit the various signals with the power required to drive an amplified analog signal through the twisted-pair telephone transmission line 30 to the CO 10. The CP-hybrid 48 enables the DSL modem 23 to simultaneously transmit and receive signals originating from and targeted for the CO 10. The CO-AFE 45 may receive the data from the CO-hybrid 49, located at the CO 10, and may then convert the received analog signal into one or more digital signals, which may then be transmitted to the CO-DSP 43 located at the CO 10. Finally, the digital information may be further distributed to one or more specified data sources (not shown) by the CO-DSP 43.

Having briefly described a DSL communications link 40 between the line card 18 located within the CO 10 and the DSL modem 23 located at the CP 20 as illustrated in FIG. 2, reference is now directed to FIG. 3. In this regard, FIG. 3 is a functional block diagram of the line card 18 of FIGS. 1 and 2 that highlights some of the functional blocks that may comprise the CO-AFE 45 introduced in FIG. 2. As illustrated in FIG. 3, the line card 18 may both send and receive data transmissions from a DSL host 41. In addition, the line card 18 may be configured to communicate with a remote DSL transmission unit at a customer premise 20 (see FIG. 1) via a twisted-pair telephone transmission line 30. The line card 18 may also comprise a CO-DSP 43 and a CO-AFE 45. The CO-AFE 45 may comprise control logic 50, a reference 52, a digital to analog converter (DAC) 54, a CO-line driver 47, a hybrid amplifier 58, and an analog to digital converter (ADC) 56. The control logic 52 may work together with reference 52 in order to coordinate and synchronize data transfers across the CO-AFE 45 in both the transmit and the receive directions.

As illustrated in FIG. 3, a transmit path across the CO-AFE 45 may comprise the DAC 54 and the CO-line driver 47. A receive path across the CO-AFE 45 may comprise the hybrid amplifier 58 and the ADC 56. The CO-AFE 45 interposed between the transmission line 30 and the CO-DSP 43 may convert digital data, from the CO-DSP 43, into a continuous time analog signal for transmission to the CP 20 via one or more transmission lines 30 (one shown). One or more analog signal representations of digital data streams supplied by one or more data sources supplied by the DSL host 41, may be converted in the CO-AFE 45 and further amplified and filtered in the CO-line driver 47 and a line transformer in order to provide a nominal analog signal to a customer premise 20 (see FIGS. 1 and 2).

In the receive direction, the hybrid amplifier 58 may be required to boost the analog signal strength of the received analog signal from the CP 20 (not shown). The received and amplified analog signal from the hybrid amplifier 58 may be forwarded to the ADC 56 which may be configured to convert the received analog signal into one or more digital signals, which may then be transmitted to the CO-DSP 43. Finally, the digital information may be communicated to the DSL host 41, which may further distribute the received data transmissions to one or more specified data sources (not shown).

In communication systems designed to transmit data over metallic transmission lines, the line driver (e.g., the CO-line driver 47) is an amplifier which delivers the energy required to transmit the intended signal to the line via back-matching resistors 59. Often impedance and voltage scaling is performed by coupling the output from the line driver 47 to the transmission line 30 via a transformer 57.

The back-matching resistors 59 serve two purposes. First, the back-matching resistors 59 match the impedance at the end of the transmission line. In order to provide a sufficient return loss, a set of resistors having a resistance approximately equal to the line's characteristic impedance, scaled by the turns-ratio of the line transformer, should terminate the line. Second, the back-matching resistors 59 permit the line driver 47 to simultaneously receive signals generated from a remote transmitter coupled to the transmission line 30 at the same time the line driver 47 is transmitting. The line driver 47 alone cannot terminate the transmission line 30 because the line driver 47 presents a low impedance to the remotely transmitted signal. The remotely transmitted signal may be recovered by subtracting from the voltage on the transmission line 30 the voltage introduced on the transmission line by the local transceiver.

In CO-DSL modem applications, multiple DSL transceivers may be co-located within the same equipment or even located on the same printed circuit board. Competitive local-exchange carriers (CLECs) often rent equipment space from the various local telephone companies on a volume basis. As a result, DSL transceiver density and power efficiency are important factors for CLECs to consider when entering local DSL service markets. Transceiver density and power efficiency are important to the various telephone companies as well, as higher transceiver density and reduced power requirements directly reduce overhead and operating costs, respectively for the CO operators. In response to transceiver density and power consumption concerns, DSL transceiver designers typically embody each of the functional DSL transceiver blocks in one or more application specific integrated circuits (ASICs).

One problem that arises when a DSL transceiver is integrated on a circuit card such as the line card 18 described hereinabove with regard to FIG. 3 is the possibility of direct current (DC) coupling between the CO-line driver 47 and the transformer 57. Under a condition resulting in a DC flow, the impedance of the transformer 57 may be negligible and as a result the CO-line driver 47 may be shorted through the back-matching resistors 59. Under this condition, the current flowing through the transformer 57 may increase excessively with various negative impacts. By way of example, an excessive DC flow through the transformer 57 may degrade or destroy the transformer windings, may overload a power supply supporting the CO-line driver 47, or may destroy the CO-line driver 47 due to excessive power dissipation.

One method that may be used to prohibit DC flow to the transformer 57 is to add a high-pass filter to the CO-AFE 45. Depending on the architecture of the CO-AFE 45, it is not always possible or desirable to integrate a high-pass filter in the transmit path at a reasonable cost. The introduction of a high-pass filter might lead to a larger circuit package as large integrated capacitors consume significant ASIC silicon area. If the CO-line driver 47 is integrated on an ASIC, the addition of a high-pass filter might necessitate the addition of input and output buffers to drive an external high-pass filter. This would result in less additional silicon area, but would require additional power consumption for the DSL transceiver. Finally, the transformer might be AC coupled to the CO-line driver 47, but this is often cumbersome and expensive due to the excessively large coupling capacitors required due to the low impedance level looking into the line transformer.

A second method that may be used to prohibit DC flow to the transformer 57 is to add DC compensation in the CO-DSP 43. It is possible to include some form of high-pass digital filtering within a DSP. However, implementing a high-pass filter within the CO-DSP 43 presents some danger. If the CO-DSP 43 enters an unexpected operating mode, the state at the output of the CO-line driver 47 is not guaranteed. In addition, if a high-pass filter were added within the CO-DSP 43, it would necessitate accurate measurement of the DC voltage out of the CO-line driver 47 and a feedback line to provide the DC voltage out of the CO-line driver 47 at the CO-DSP 43 to permit the CO-DSP 43 to adjust for the voltage. The high-pass filter approach is complicated and may succeed when the mode of operation is an expected mode and the DC voltage at the output of the CO-line driver 47 is accurately measured. However, if the DSL transmission unit were to encounter an excessively large DC voltage as a result of a CO-DSP 43, CO-AFE 45, or other DSL transmission unit malfunction, the error condition could not be corrected with the CO-DSP 43.

Accordingly, there is a need for a system that can work in concert with a transceiver to prevent possible hardware damaging signal conditions.

SUMMARY OF THE INVENTION

In light of the foregoing, the invention is a system and a method for constructing a signal integrity supervisor capable of both detecting and triggering an appropriate response when signals designated for transmission indicate a potential damaging transmitter operating mode. The system and method of the present invention takes advantage of the inherent property of a Delta-Sigma Modulator (DSM) which makes the probability of encountering a long string of consecutive ones or zeroes during nominal operation very small. The signal integrity supervisor ensures nominal transmitter operation by monitoring the data and the clock inputs to a DAC within the transmitter. A signal integrity supervisor system may comprise a data signal supervisor and a clock signal supervisor. A data signal supervisor in accordance with the present invention may comprise a comparator and a maximum value counter. A clock signal supervisor in accordance with the present invention may comprise a pair of monostable circuits, an inverter, and a NAND logic gate. The data signal supervisor may be configured to power down a line driver upon detecting a data stream having a continuous voltage level. The clock signal supervisor may be configured to reset the transmitter if a "missing" clock signal state is detected.

The present invention can also be viewed as providing a method for preventing a transmission unit from forwarding signals that may result in a DC flow condition. In its broadest terms, the method can be described by the following steps: monitoring a data signal; generating a power down signal in response to a data signal of unchanging magnitude; monitoring a clock signal; and generating a reset signal in response to clock signal frequency that fails to meet or exceed a predetermined minimum clock frequency.

Other features and advantages of the present invention will become apparent to one skilled in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENTS

Figure 1:
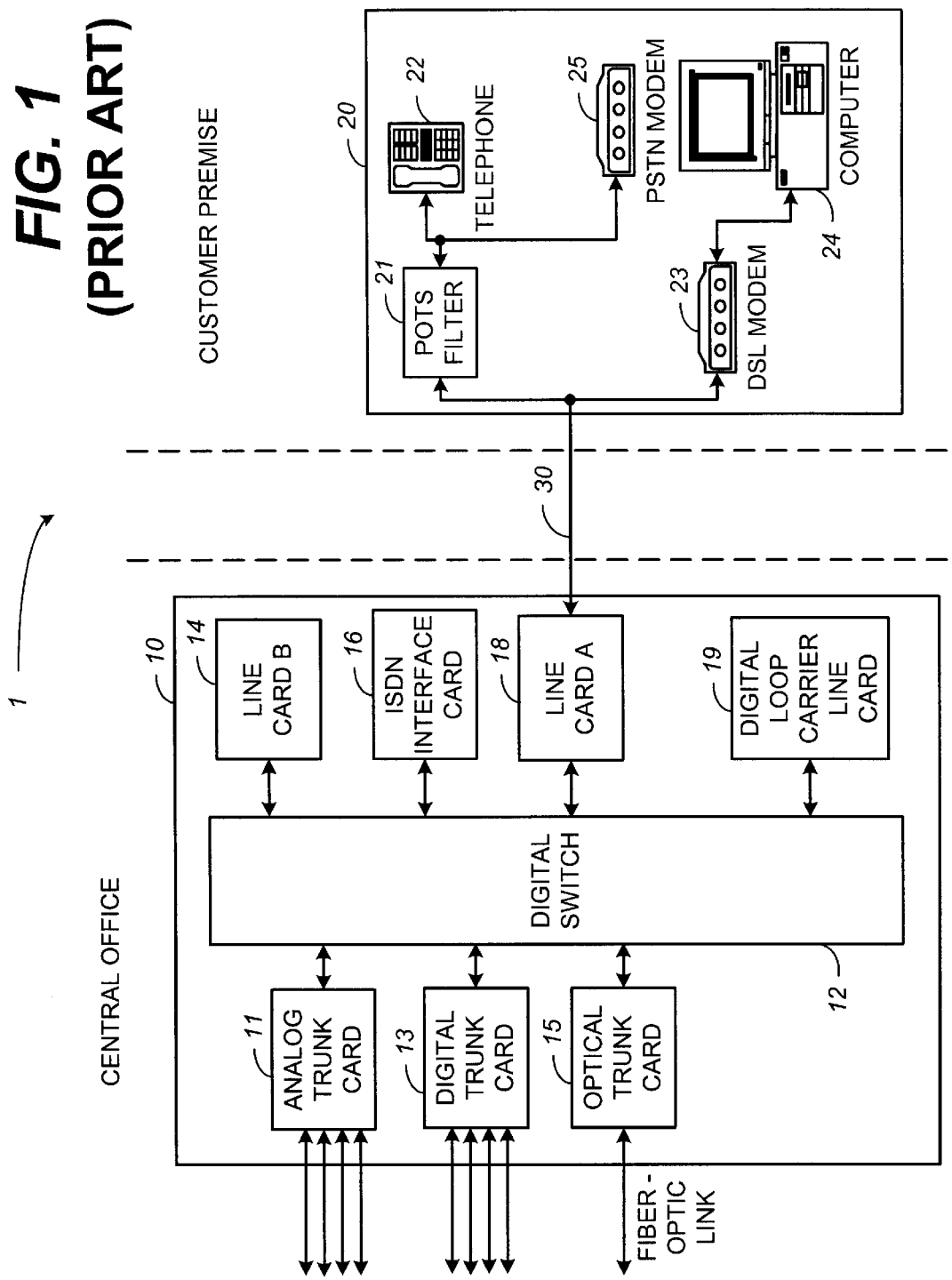
FIG. 1 is a prior art block diagram illustrating a DSL communications system between a CO and a CP.
Figure 2:
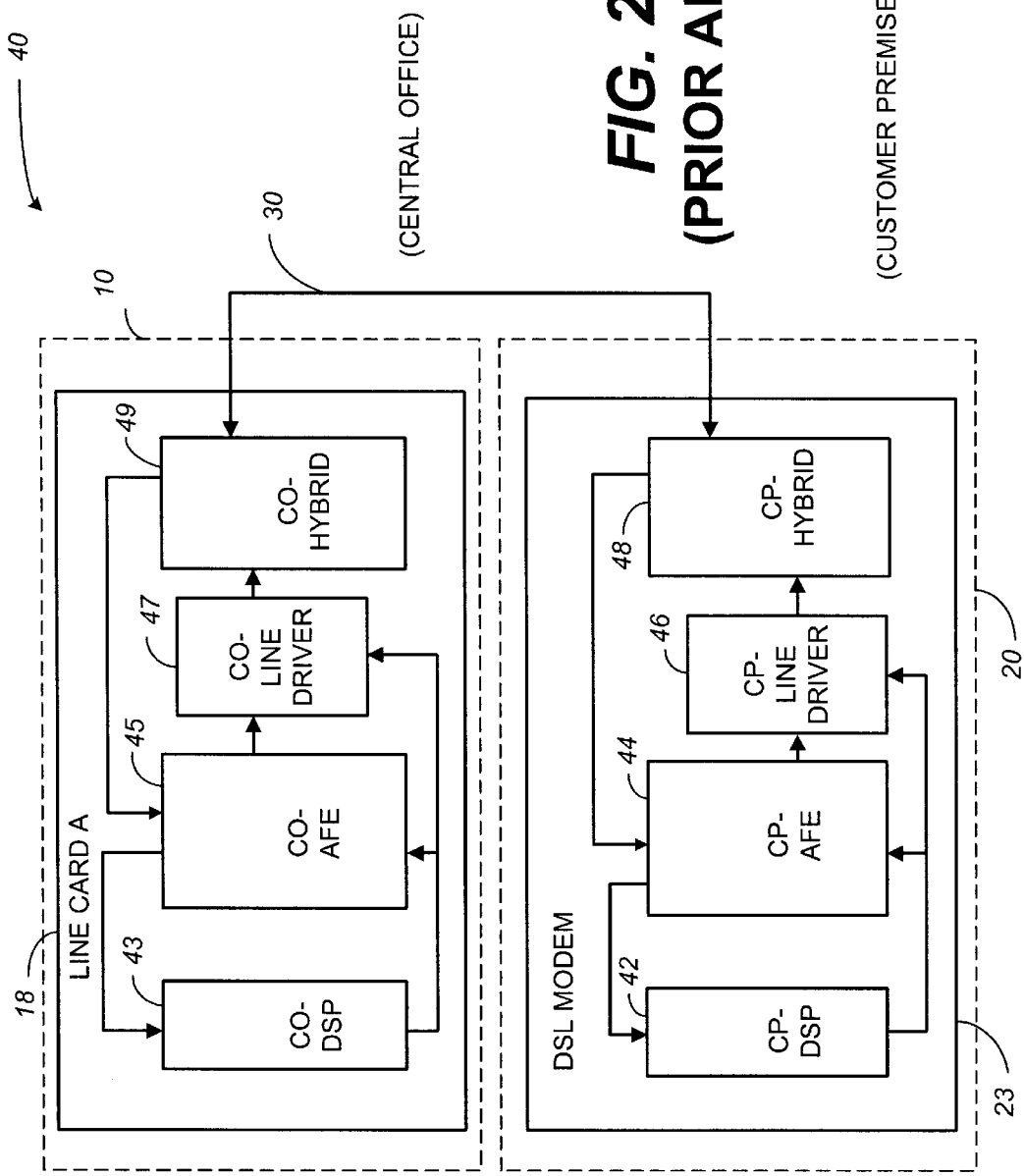
FIG. 2 is a prior art block diagram illustrating a DSL communication link used in the DSL communication system of FIG. 1 between a line card A and a DSL modem.
Figure 3:
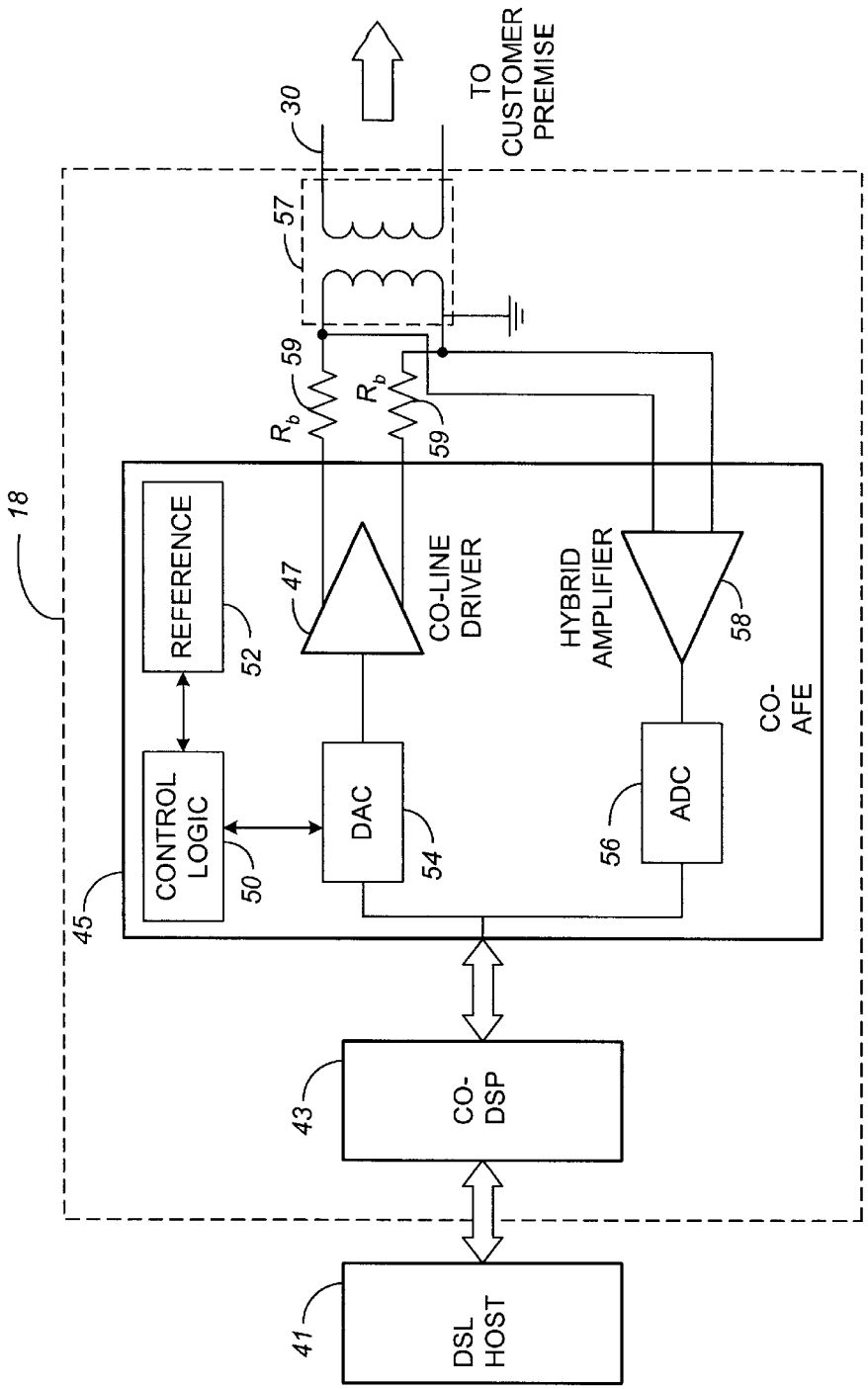
FIG. 3 is a prior art functional block diagram further illustrating the CO-AFE of FIG. 2.
Figure 4A:
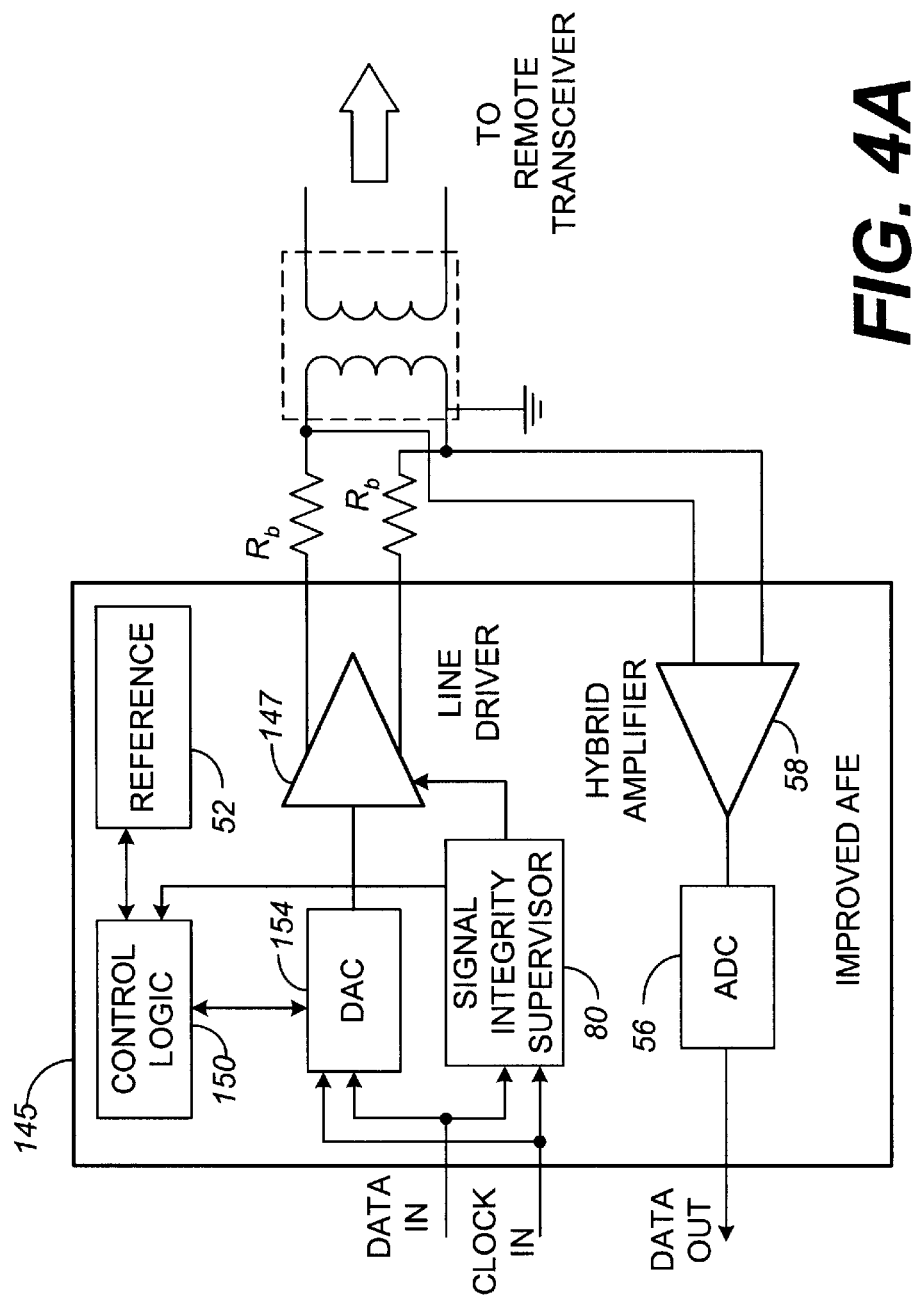
FIG. 4A is a functional block diagram illustrating a possible location of the signal integrity supervisor in accordance with the present invention within an improved AFE.

Turning now to the drawings illustrating the present invention, wherein like reference numerals designate corresponding parts throughout the drawings, FIG. 4A is a functional block diagram illustrating the location of the signal integrity supervisor 80 in accordance with one embodiment of the present invention within an improved AFE. As illustrated in FIG. 4A, a signal integrity supervisor 80 may be incorporated within an improved AFE 145. An improved AFE 145 in accordance with the present invention may comprise control logic 150, a reference 52, a DAC 154, a line driver 147, an ADC 56, a hybrid amplifier 58, and the signal integrity supervisor 80. The signal integrity supervisor 80 may be configured to receive data and clock signal inputs that may originate in a DSP (not shown). In response to AFE data and clock input signals which may result in a fault condition (such as a large DC signal) to the input of a transmission line transformer, the signal integrity supervisor 80 may be configured to generate a fault recovery response. By way of example, the fault recovery response may comprise powering down the line driver 147 and or resetting the AFE 145 when a fault condition is detected on either the AFE data input or the AFE clock input signals. It is important to note that a fault condition may comprise any unexpected state on the DATA input or the clock input of the AFE 145. By way of further example, a DC signal can be expected both when a data value remains constant over multiple clock cycles and when the clock signal fails, thereby permitting the AFE data output to remain constant for greater than an intended clock cycle. As illustrated, the signal integrity supervisor 80 may transmit a line driver power down output signal in response to one or more AFE data input signal conditions. Similarly, the signal integrity supervisor 80 may transmit an AFE reset output signal in response to one or more clock signal conditions.

It is significant to note that in a preferred embodiment, the signal integrity supervisor 80 in accordance with the present invention is integrated within an improved AFE 145. However, those skilled in the art will appreciate that the signal integrity supervisor 80 may be located within a DSP coupled to the improved AFE 145 or may be disposed such that the signal integrity supervisor 80 receives the clock and data inputs as applied to the DAC 154.

Figure 4B:
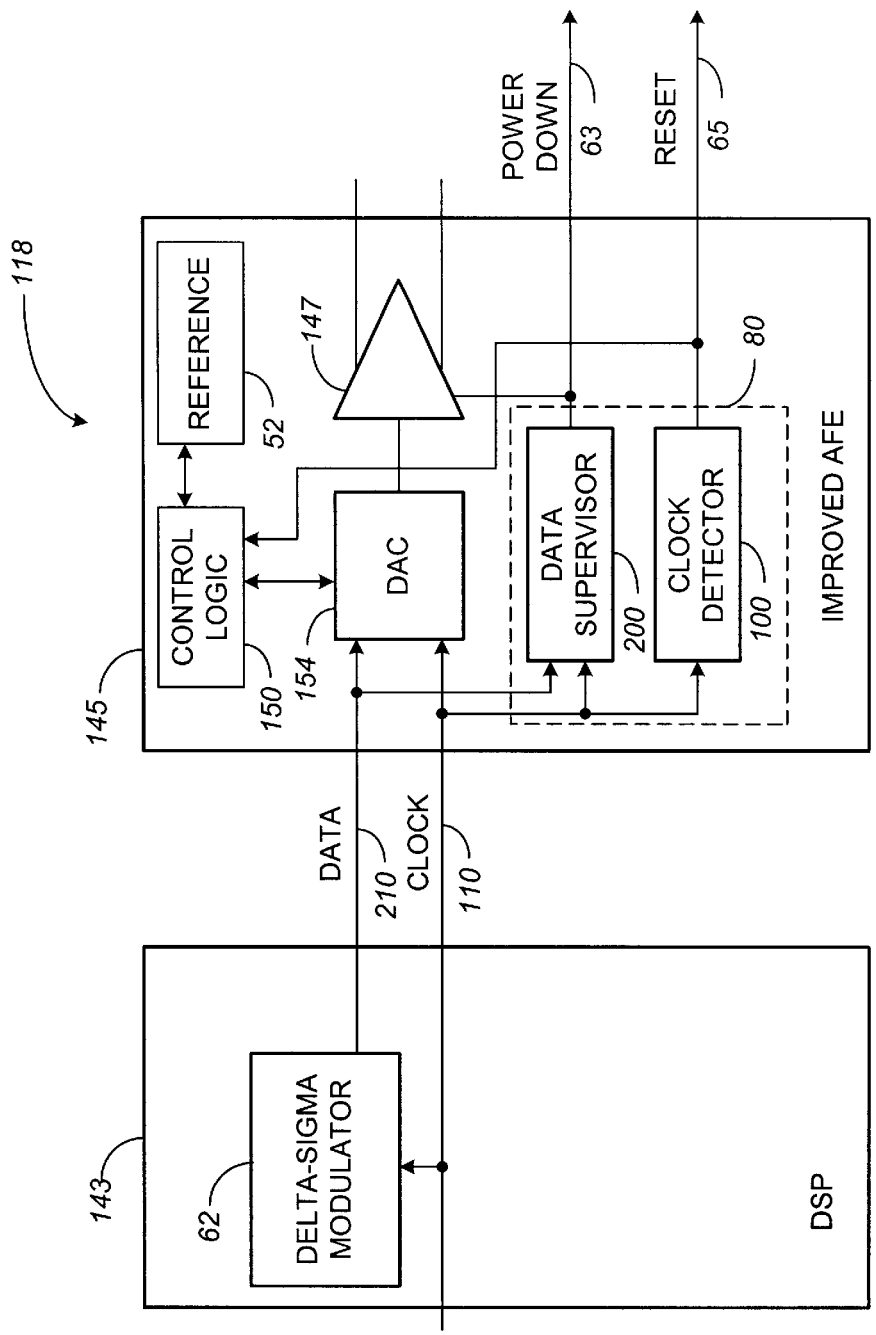
FIG. 4B is a functional block diagram further illustrating the signal integrity supervisor of FIG. 4A.

Having briefly introduced a signal integrity supervisor in accordance with the present invention with regard to the functional block diagram of FIG. 4A, reference is now directed to FIG. 4B. In this regard, FIG. 4B is a functional block diagram further illustrating the signal integrity supervisor 80 of FIG. 4A. As illustrated in FIG. 4B, an improved line card 118 may comprise a DSP 143 and an improved AFE 145. The DSP 143 may comprise a delta-sigma modulator 62 in the data signal transmit path. Delta-sigma data modulation is a method that may be used to perform both analog to digital conversion and digital to analog conversion. Delta-sigma data modulation uses the concept of oversampling, noise shaping, and digital signal processing in order to achieve high accuracy. Various delta-sigma modulator architectures exist and are useful for a number of instrumentation, speech encoding, high-fidelity audio, digital cellular, and other communications systems. It will be appreciated by those skilled in the art that a delta-sigma modulator (DSM) 62 may be implemented in the DSP 143 or the AFE 145. For the present example illustrated in FIG. 4B, the DSM 62 is integrated within the DSP 143. As illustrated in FIG. 4B, information transmitted from the DSM 62 to the improved AFE 145 may comprise a data signal and a clock signal intended for digital to analog conversion in the DAC 154. Because of the inherent predictability of the DAC 154, it is possible to predict the state of the DAC 154 data output by supervising the data and clock signal inputs to the device.

As further illustrated in FIG. 4B, a signal integrity supervisor 80 in accordance with the present invention may comprise a clock detector 100 and a data supervisor 200. The clock detector 100 may be configured to receive the DAC 154 clock input signal 110. In response to one or more clock signal anomalous conditions, the clock detector 100 may generate a reset signal 65 that may be forwarded to the control logic 150 and to various devices external to the improved AFE 145. In turn, the control logic 150 may be configured to reset the improved AFE 145 by reinitializing the DAC 154. In a preferred embodiment, a clock detector 100 in accordance with the present invention may trigger an AFE reset signal in an attempt to regenerate a nominal AFE system clock. It will be appreciated that a nominal AFE system clock is required in order to ensure that the data supervisor 200 accurately identifies when the DAC 154 has been presented with an input data stream (e.g., the data input signal 210) having a continuous signal level for a period that exceeds a predetermined maximum. It will be further appreciated that in the extreme case of a clock input signal 110 loss, even a continuously changing data input stream may result in an unchanging DAC 154 output signal.

As also illustrated in FIG. 4B, an improved AFE 145 data signal input 210 shared by the DAC 154 and the data supervisor 200 may originate within the delta-sigma modulator 62 located within the DSP 143. The data supervisor 200 may generate a line driver power down signal 63 in response to one or more anomalous data signal input 210 conditions.

As illustrated in FIG. 4B, the data supervisor 200 may be configured to apply the line driver power down signal 63 to the line driver 147 and to various devices external to the improved AFE 145. As previously described with regard to the clock detector 100, the data supervisor 200 may generate the line driver power down signal 63 in response to an input data stream (e.g., the data input signal 210) at the input to the DAC 154 that may result in a continuous unchanging output signal from the DAC 154. In a preferred embodiment, the data supervisor 200 may trigger the line driver power down signal 63 after receiving and detecting a predetermined number of consecutive data values.

Figure 5:
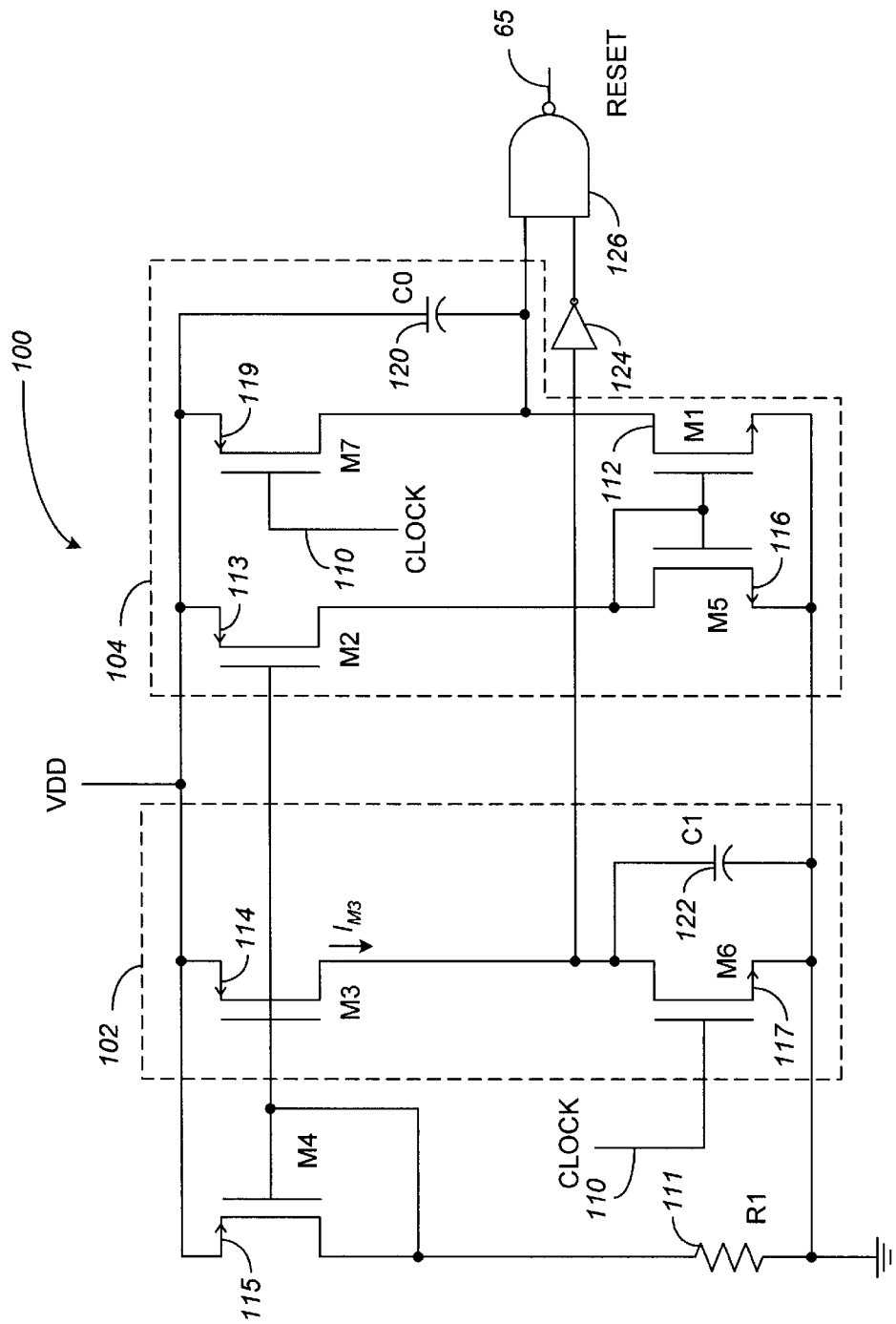
FIG. 5 is a circuit schematic of the clock signal supervisor of the signal integrity supervisor of FIG. 4B.

Having briefly introduced the clock detector 100 and the data supervisor 200 of the signal integrity supervisor 80 in accordance with the present invention in FIG. 4B, reference is directed to FIG. 5, which illustrates an exemplary circuit schematic that may be used to implement the clock detector 100. As illustrated in FIG. 5, a clock detector 100 in accordance with the present invention may comprise a pair of monostable circuits 102, 104 a semiconductors herein labeled M4 115, a resistor 111, an inverter 124 and an NAND logic gate 126. As further illustrated in FIG. 5, a clock detector 100 in accordance with the present invention may receive a clock input signal 110 and may be configured to generate a clock anomaly detect output signal (e.g., the reset 65 signal). Each of the monostable circuits 102, 104 may be configured to receive the clock input signal 110 with the output of each of the monostable circuits 102, 104 forming the inputs to the NAND logic gate 126. The steady state stable conditions for the two-monostable circuits 102, 104 are encountered when the output of monostable 102 is at VDD and when the output of monostable 104 is at ground. Monostable 102 is reset when the clock-input signal 110 is high and monostable 104 is reset when the clock-input signal 110 is low. When the AFE clock input signal 110 is active (i.e., transitioning between electrical ground to VDD and back to ground at an acceptable frequency) the monostables 102 and 104 are alternatively repeatedly reset. If the AFE clock input signal 110 remains high or low for a long duration, one of the monostables 102, 104 will not reset and will return to a stable steady-state value. The reset signal 65 generated at the output of the NAND logic gate 126 is active or high when one of the monostables 102, 104 is at its steady-state value (i.e., when the AFE input clock signal 110 is not active).

As illustrated in FIG. 5, the first monostable circuit 102 may comprise a capacitor C1 122, a first semiconductor device M6 117, and a second semiconductor device M3 114. Semiconductor device M3 114 may be configured as a current generator. The combination of a semiconductor device M4 115 and a resistor R1 111 may define a current mirror. The current mirror may be used to define the current flowing from the current generator formed by M3 114 as follows:

$$I_{M3} = \frac{(VDD - VGS_{M4})}{R1}. \qquad \text{Eq. 1}$$

When the AFE clock input signal 110 is high, the semiconductor device M6 117 is on and the voltage across capacitor C1 122 is zero. The current flowing from M3 114 is flowing through M6 117. When the AFE clock input signal 110 goes low, the semiconductor device M6 117 is turned off and the current from M3 114 will flow through C1 112. As a result, the voltage across C1 122 will rise in response to the current from M3 114 until the source of M3 114 reaches VDD, which is the steady-state value for monostable 102.

As further illustrated in FIG. 5, the second monostable circuit 104 may comprise a capacitor CO 120, a first semiconductor device M7 119, a second semiconductor device M5 116, a third semiconductor device M2 113, and a fourth semiconductor device M1, 112. It is significant to note that the logic levels for the various semiconductor devices 119, 116, 113 and 112 of the second monostable circuit are inverted. It is also important to note that the additional stage comprising semiconductor devices M2 113 and M5 116 may mirror the current from semiconductor device M7 119 to device M1 112. Furthermore, resistance and capacitance values can be selected in order to adjust the minimum frequency, $F_{min}$, at which the clock detector 100 may trigger as illustrated in the following equation:

$$F_{min} \approx \frac{(VDD - VGS_{M4})}{VDD * R * C} \cdot \alpha \qquad \text{Eq. 2}$$

where, $\alpha$ is a constant that changes in relation to the semiconductor technology used within the AFE 145.

Figure 6:
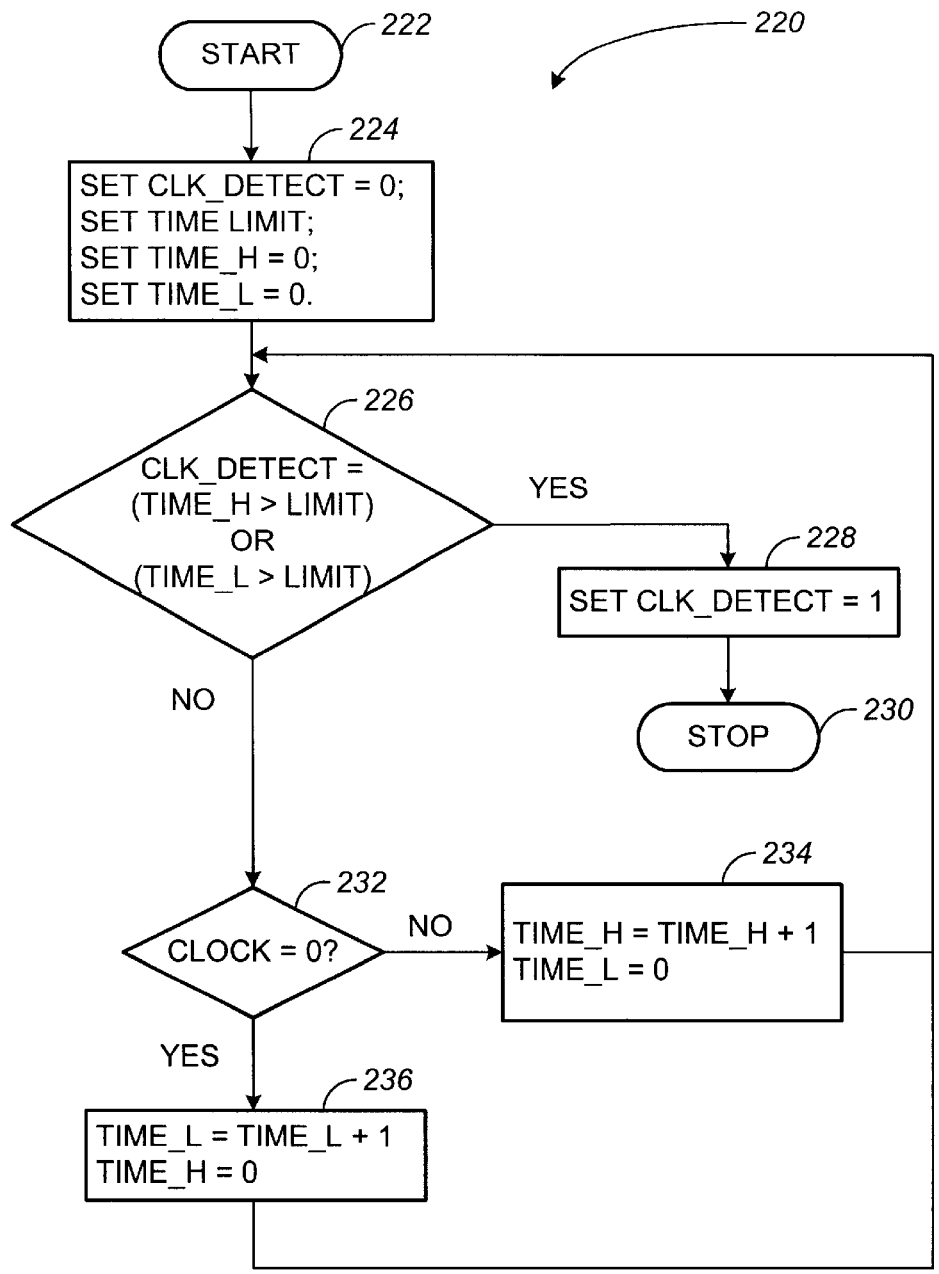
FIG. 6 is a flow chart further illustrating a method for detecting a clock signal that can be applied by the clock signal supervisor of FIG. 5.

Having introduced and described the operation of an exemplary circuit schematic that may be used to implement the clock detector 100 of the signal integrity supervisor 80 of the present invention with regard to FIG. 5, reference is now directed to FIG. 6. In this regard, FIG. 6 is a flowchart highlighting a method for detecting a nominal clock signal.

As illustrated in FIG. 6, a method for detecting an anomalous clock signal 220 may begin with step 222, herein designated as "start." Next, in step 224, the method for detecting an anomalous clock signal 220 may set a clock detection variable, CLK_DETECT, to zero. In addition, a time limit corresponding to the minimum acceptable clock frequency, $F_{min}$, and variables to monitor the time that the clock signal remains high and low, TIME_H and TIME_L, respectively may be set to zero. The method for detecting an anomalous clock signal 220 may continue by performing a dual comparison in step 226 to determine if either TIME_H or TIME_L have exceeded the time limit set in step 224. As illustrated in FIG. 6, if the determination is affirmative, the method for detecting an anomalous clock signal 220 may proceed to step 228 where the CLK_DETECT variable may be set to 1 or logic high. As further illustrated, the method may then terminate at step 230, herein designated, "stop." Otherwise, if the determination in step 226 is negative, the method for detecting an anomalous clock signal 220 may proceed to step 232 where a determination may be performed as to whether the clock signal is 0 or logic low. If the determination in step 232 is negative, that is the clock is logic high, the method proceeds to step 234 where TIME_H may be incremented and TIME_L may be reset to zero. The method for detecting an anomalous clock signal 220 may proceed to repeat steps 226 through 234 as herein previously described. If the determination in step 232 is affirmative, that is the clock signal is determined to be low, the method for detecting an anomalous clock signal 220 may proceed to step 236 where TIME_L may be incremented and TIME_H may be reset to zero. As further illustrated in FIG. 6, the method for detecting an anomalous clock signal 220 may be configured to repeat steps 226 through 236 as previously described.

Figure 7:
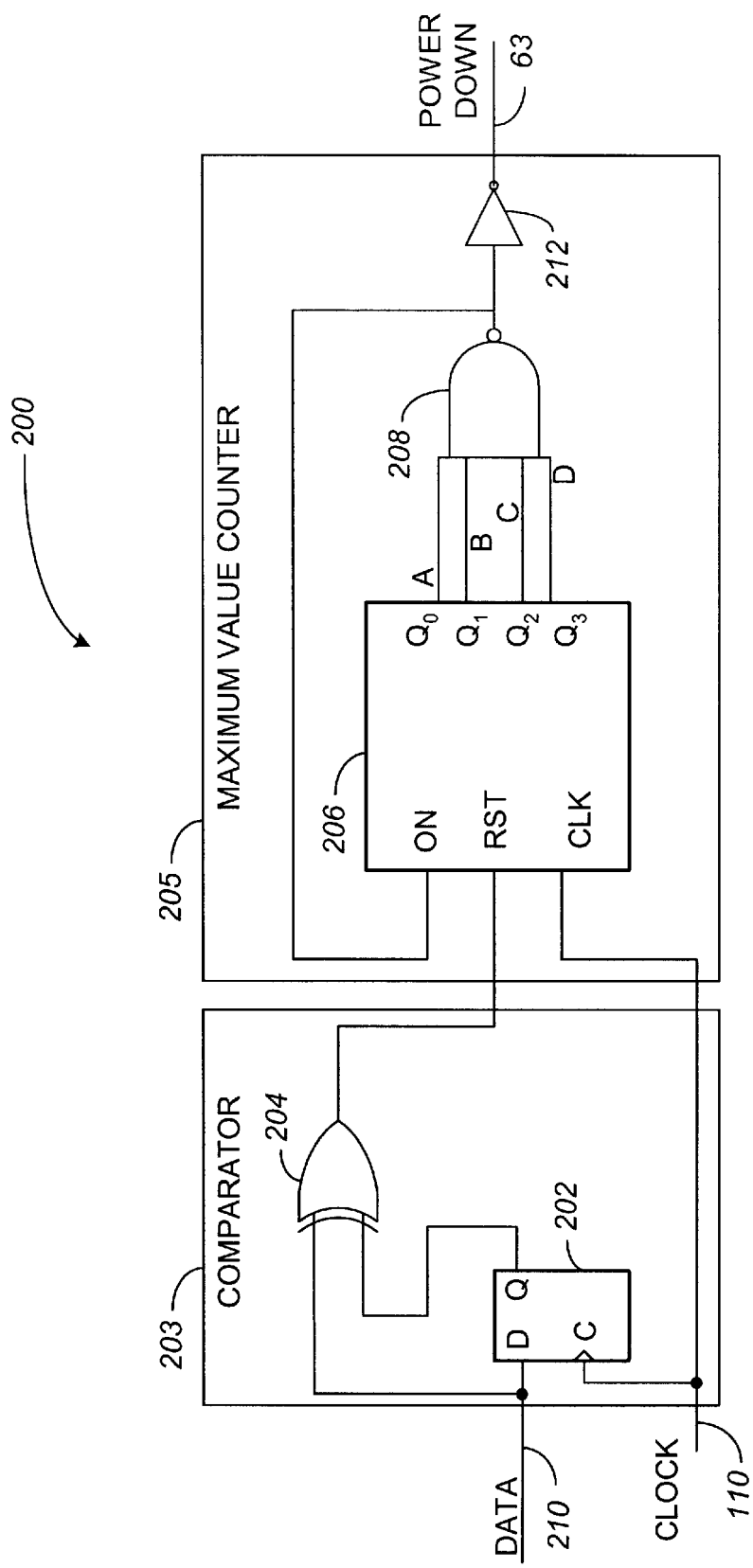
FIG. 7 is a circuit diagram of the data signal supervisor of the signal integrity supervisor of FIG. 4B.

Having thus described a method for detecting an anomalous clock signal 220 with regard to FIG. 6, reference is now directed to FIG. 7, which illustrates an exemplary digital circuit that may be used to realize the data supervisor 200 of FIG. 4B. As illustrated in FIG. 7, a data supervisor 200 in accordance with the present invention may comprise a comparator 203 and a maximum value counter 205. As illustrated in FIG. 7, the comparator 203 may comprise a D flip-flop 202 and an exclusive-OR logic gate 204. The comparator 203 may be configured to receive a clock input signal 110 and a data signal input 210. The comparator 203 may be further configured to forward a counter reset signal to the maximum value counter 205 each time the exclusive-OR logic gate 204 registers consecutive data signals having different logic values. Otherwise, the maximum value counter 205 may be configured to simply increment by one for each consecutive clock cycle that the data value on the data signal input 210 remains the same. As also illustrated in FIG. 7, the maximum value counter 205 may comprise a X-bit counter 206, a NAND logic gate 208, and an inverter 212. The maximum value counter 205 may be configured to receive a clock input signal 110 and a reset input signal. Furthermore the maximum value counter 205 may be configured to provide a logic high output signal (e.g., the power down 63 signal) when a maximum value has registered by the X-bit counter 206. As by way of a non-limiting example, if the X-bit counter 206 was implemented with a 4-bit counter as illustrated in FIG. 7, the output of the NAND logic gate 208 would go to logic low once the counter reached the maximum value of 15 consecutive ones or zeroes. Otherwise, the comparator 203 would have registered consecutive clock cycles where the data input level changed and the maximum value counter 205 would have received a reset trigger from the comparator 203.

The data integrity supervisor 200 of FIG. 7 takes advantage of the inherent property of the delta-sigma modulator 62 (see FIG. 4B) that makes it highly unlikely that a consecutive number of ones or zeroes in the data stream (as provided by the data input signal 210) will exceed a predetermined maximum value (15 for the circuit illustrated). For a multi-loop delta-sigma modulator (not shown) a data integrity supervisor in accordance with the present invention may be configured to monitor the first of the two outputs, simply discarding any error cancellation bits. Not described herein is the architecture of the X-bit counter 206. A simple asynchronous counter with a cascaded delay may suffice. As will be readily appreciated by those skilled in the art, if a more sensitive data integrity supervisor 200 is desired, the X-bit counter 206 may be implemented with a 3-bit counter. A data integrity supervisor 200 using a 3-bit counter would trigger a potential data anomaly after receiving 8 consecutive data values having the same logic level.

Figure 8:
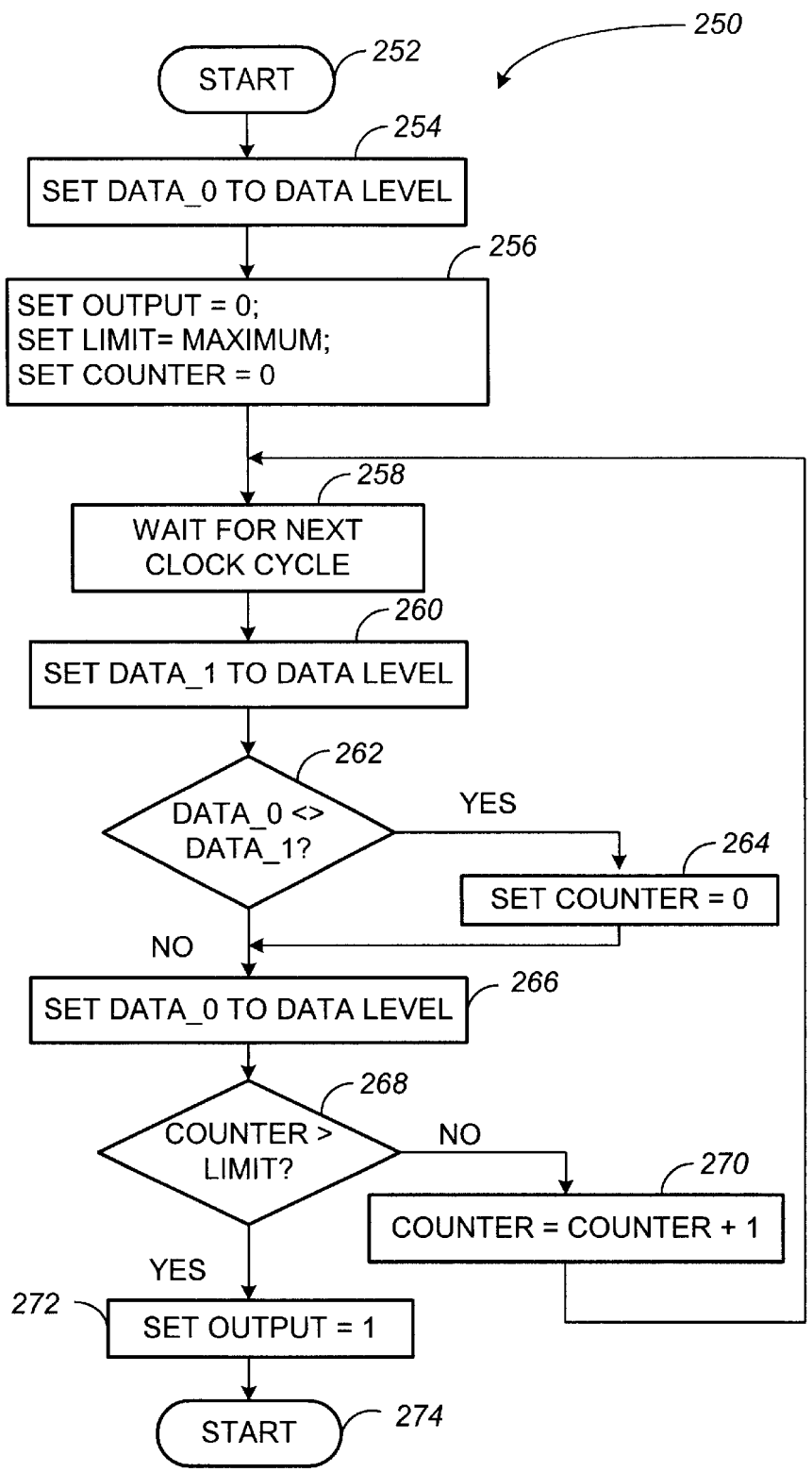
FIG. 8 is a flow chart illustrating a method for detecting a data signal that can result in DC flow that may be applied by the data signal supervisor of FIG. 7.

Having introduced and described the operation of an exemplary circuit schematic that may be used to implement the data integrity supervisor 200 of the signal integrity supervisor 80 of the present invention with regard to FIG. 7, reference is now directed to FIG. 8. In this regard, FIG. 8 is a flow chart illustrating a method for detecting a data signal that may result in a DC flow in a communications system.

As illustrated in FIG. 8, a method for detecting a data input signal 210 (see FIGS. 4A, 4B, and 7) that may result in a DC flow 250 may begin with step 252, herein designated as "start." Next, in step 254, the method for detecting a data input signal 210 that may result in a DC flow 250 may set a variable DATA_0 to the current logic level of the data input signal 210 for the present clock cycle. Next, in step 256, the method for detecting a data input signal 210 that may result in a DC flow 250 may set an output signal, herein designated, OUTPUT, to logic low or zero; set a variable, LIMIT, to the maximum number of consecutive clock cycles that may have the same logic level; and set a variable, COUNTER, to 0. The method for detecting a data input signal 210 that may result in a DC flow 250 may proceed by waiting for the next clock cycle in step 258. Upon encountering the next clock cycle in step 258, step 260 may be performed where the logic level of the data input signal 210 for the present clock cycle is determined. As illustrated, the logic level for the present clock cycle of the data input signal 210 may be used to set variable DATA_1. Next, in step 262, a determination may be performed as to whether DATA_0 is not equal to DATA_1. If the determination in step 262 is affirmative, the method for detecting a data input signal 210 that may result in a DC flow 250 may proceed to step 264 where the variable, COUNTER, may be reset to 0. Otherwise, if the determination in step 262 is negative, that is the logic level of the data input signal 210 has not changed between the clock cycles, the method may proceed to step 266 where DATA_0 may be set to the logic level of the data input signal 210 for the present clock cycle. Next, a determination may be performed in step 268 as to whether the variable, COUNTER, has reached the maximum value as set by the variable, LIMIT in step 256 hereinabove. If the determination in step 268 is negative, the method for detecting a data input signal 210 that may result in a DC flow 250 may proceed to step 270 where the variable, COUNTER, may be incremented by 1. As illustrated in FIG. 8, the method may be configured to repeat steps 258 through 270 as described above. Otherwise, if the determination in step 268 is affirmative, that is the variable, COUNTER, has reached the value of LIMIT, the method may proceed to step 272 where a variable, OUTPUT, may be set to 1 or to a high logic level. As further illustrated, the method may then terminate at step 274, herein designated, "stop."

Although the clock detector 100 and the data supervisor 200 (see FIG. 4B) of the signal integrity supervisor 80 of FIG. 4A are implemented in hardware as illustrated in FIGS. 5 and 7, it will be appreciated by those skilled in the art that the clock detector 100 and the data supervisor 200 could be implemented in firmware. Furthermore in this regard, the data integrity supervisor 80 of the present invention can be implemented in hardware, software, firmware, or a combination thereof. If implemented in software, the data integrity supervisor 80 may be implemented in software or firmware that is stored in a memory and that is executed by a suitable instruction execution system. If implemented in alternative hardware configurations, as in an alternative embodiment, the data supervisor 200 and the clock detector 100 of the data integrity supervisor 80 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In addition it is important to note that any process descriptions or blocks in flow charts (e.g., FIGS. 6 and 8) should be understood to represent modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. An analog front end for a digital subscriber line data communication system, comprising:
   a line driver for transmitting a data signal over a local loop;
   a digital to analog converter having an output connected to an input of the line driver, the digital to analog converter also having a data input for receiving a digital data signal and a clock input for receiving a clock signal; and
   a data signal supervisor circuit having a first input configured to receive the data signal and a second input configured to receive the clock signal, the supervisor circuit having comparison circuitry for logically comparing a first value of the data signal in relation to a signal change of the clock signal to a second value of the data signal in relation to a previous signal change of the clock signal and asserting a transmit control output signal if the first value of data signal is the same as the second value of the data signal.

2. The analog front end of claim 1, further comprising:
   a clock detector circuit having an input configured to receive the clock signal, the clock detector circuit further including frequency detection circuitry configured to assert a reset signal in response to the frequency of the clock signal.

3. The analog front end of claim 2, further comprising:
   a control circuit having a reset input configured to receive a reset signal from the clock detector, the control circuit configured to reinitialize the digital subscriber line data communication system in response to the reset signal.

4. The analog front end of claim 3, wherein the control circuit includes circuitry for commanding the digital to analog converter to disable an output signal.

5. The analog front end of claim 1, wherein the comparison circuitry includes a counter circuit configured to count a predetermined number of clock signal cycles where the data signal remains unchanged.

6. The analog front end of claim 5, wherein the comparison circuitry further comprises Exclusive OR logic having an input that is indicative of the logical comparison of the first value of the data signal with the second value of the data signal, the Exclusive OR logic being in communication with an input of the counter circuit.

7. An analog front end for a digital subscriber line data communication system, comprising:
   means for transmitting a data signal;
   means for converting a digital input signal into an analog representation of the digital input signal;
   means for detecting an at least one data signal condition, wherein said condition occurs when there is no substantial change in consecutive values of the digital data signal within a predetermined number of clock cycles; and
   means for asserting an at least one transmit control output signal in response to the at least one data signal condition.

8. The analog front end of claim 7, further comprises means for receiving a digital data stream from a delta-sigma modulator.

9. The analog front end of claim 7, wherein the means for detecting an at least one data signal condition is performed by monitoring a digital data stream.

10. The analog front end of claim 9, wherein the digital data stream comprises a data signal and a clock signal.

11. The analog front end of claim 10, wherein the means for detecting an at least one data signal condition is performed by a data supervisor.

12. The analog front end of claim 10, wherein the means for detecting an at least one data signal condition is performed by a clock detector.

* * * * *